United States Patent

Wu et al.

[11] Patent Number: 5,997,626
[45] Date of Patent: Dec. 7, 1999

[54] LOW ABRASION CALCINED KAOLIN PIGMENTS AND ENHANCED FILTRATION METHOD

[75] Inventors: Joseph H. Z. Wu, Somerset, N.J.; Michael G. Londo, Macon, Ga.; Mitchell J. Willis, Bainbridge, Ga.; Rene S. Guermonprez; Tracey A. Burbank, both of Macon, Ga.

[73] Assignee: Engelhard Corporation, Iselin, N.J.

[21] Appl. No.: 09/071,626

[22] Filed: May 1, 1998

[51] Int. Cl.$^6$ ............... C09C 1/42; C09C 1/28; C09C 1/02; C09C 1/04; C04B 14/10

[52] U.S. Cl. ............... 106/486; 106/467; 106/468; 106/470; 106/466; 106/287.17; 106/286.5; 106/287.34; 502/68

[58] Field of Search ............... 502/68; 501/145, 501/146, 147; 106/486, 467, 286.5, 287.17, 287.34, 468, 470, 466; 423/131

[56] References Cited

U.S. PATENT DOCUMENTS

| | | | |
|---|---|---|---|
| 2,939,764 | 6/1960 | Schoenfelder et al. . | |
| 3,014,836 | 12/1961 | Proctor, Jr. | 106/486 |
| 3,586,523 | 6/1971 | Fanselow et al. . | |
| 4,381,948 | 5/1983 | McConnell et al. . | |
| 4,601,997 | 7/1986 | Speronello | 423/131 |
| 4,854,971 | 8/1989 | Gane et al. | 106/486 |
| 4,937,210 | 6/1990 | Jones et al. | 423/131 |
| 5,022,924 | 6/1991 | Raythatha et al. . | |

*Primary Examiner*—Michael Marcheschi

[57] ABSTRACT

A method for reducing the abrasion of a silica-containing calcined kaolin pigment by the controlled leaching of silica from the pigment, preferably by the use of a caustic solution to dissolve the silica out of the calcined kaolin. In another aspect of the invention, the brightness, opacity, or both of a calcined kaolin is increased by increasing the fineness of the kaolin feed supplied to the calciner. The combination of these methods results in the production of a calcined kaolin with low abrasion and high brightness and opacity. Another aspect of the invention concerns an improved method of filtration of dilatent materials such as the leached calcined clay.

11 Claims, No Drawings

LOW ABRASION CALCINED KAOLIN PIGMENTS AND ENHANCED FILTRATION METHOD

This invention relates to novel calcined pigments characterized by a unique combination of exceptionally low abrasion along with excellent high brightness and, preferably, hiding power equal to that achieved by premium conventional calcined kaolin pigments, which do not possess the low abrasion of the present pigments. The invention relates also to a method of producing such pigments by subjecting fully calcined pigments, and particularly relatively fine fully calcined pigments, to a caustic leaching process which selectively leaches silica from the calcined pigments, thereby reducing their abrasion characteristics.

Calcined kaolin pigments have been used for several decades in a number of industrial applications such as paper coating, paper filling, paints, plastics, etc. In these applications they impart to the finished products a number of desirable properties: brightness, opacity (hiding power), strength (in plastics), friction (in paper). Paper coating and filling applications require almost exclusively fine fully calcined kaolin pigments such as the 93% brightness ANSILEX 93® pigment manufactured by Engelhard Corporation. See, for example, U.S. Pat. No. 3,586,523, Fanselow et al.; incorporated herein by reference, which describes the production of such pigments from ultrafine tertiary "hard" ultrafine kaolins. Because of high brightness and light scattering properties of these fine fully calcined kaolin pigments, their primary function in paper applications is to provide opacity and brightness, often as a replacement for much costlier titanium dioxide pigments, which can also be used to enhance these functional properties.

Although these fully calcined kaolin pigments obtained by calcining ultrafine hard kaolins are less abrasive than other calcined kaolin pigments, they are relatively abrasive when compared with available noncalcined kaolin pigments. For example, the conventional so-called "low abrasion" calcined kaolin pigments such as ANSILEX 93® typically have an Einlehner abrasion value of about 20. In practical terms this translates into increased wear of web forming screens (wires) on paper making machines, dulling of paper slitter knives, wear of printing plates when they come in contact with coated paper containing fine calcined pigments in the coating formulation, and, in general, wear of any surface that comes in contact with these pigments. Paper makers are becoming increasingly demanding in their need for lower abrasion.

Fully calcined kaolin generally has much higher abrasion than kaolin in hydrous form. The Einlehner abrasion test and the Needle abrasion test are two of the generally used abrasion tests in pigment and paper industries. The Einlehner abrasion of a fully calcined kaolin is generally about 20 mg/100,000 revolutions, and the Needle abrasion is about 1000 μg. For hydrous kaolins, the Einlehner abrasion is about 5 mg/100,000 revolutions, and the Needle abrasion is about 200 μg.

One technique for producing a low abrasion calcined kaolin has been to control the fineness of the raw clay prior to calcination. For example, in U.S. Pat. No. 4,381,948, McConnell et al, the proposal was made to employ especially fine raw clay (100% by weight less than 1 μm) as feed to the calciner. Hard clays of the type used in the Fanselow patent (supra) were used in illustrative examples.

U.S. Pat. No. 5,022,924 discloses a method for reducing the abrasiveness of calcined clay. The method comprises intermixing the clay prior to calcination with a finely-divided silica.

Although a number of known ways have been suggested in the art for reducing the abrasion of a calcined kaolin, such methods have generally resulted in a loss of brightness or other desirable properties of the pigment. There is a need for a process for effectively treating a fully calcined kaolin to reduce its abrasion, while maintaining its brightness and ability to opacify when used in paper, paints and plastics.

It is well known that when the hydrated aluminum silicates of kaolin clay have been fully calcined, silica can be readily leached with sodium hydroxide solution with minimal removal of alumina. Reference is made to U.S. Pat. No. 2,939,764 to Schoenfelder et al. The Schoenfelder patent contains figures demonstrating the effect of calcining kaolin clay at various temperature levels on the solubility of alumina and silica in sodium hydroxide solutions of concentrations ranging from about 5% to 40%. The figures indicate that up to about 80% by weight of the silica content of high purity kaolin can be leached with strong caustic solutions when the kaolin has been previously calcined at about 1000° C. The teachings of U.S. Pat. No. 2,939,764 are incorporated herein by reference.

SUMMARY OF THE INVENTION

One aspect of this invention relates to a method for reducing the abrasion of a silica-containing calcined kaolin pigment comprising leaching no more than about 40 weight % of the silica from the pigment.

Another aspect of this invention relates to a method for enhancing the filtration of a dilatant material comprising the steps of:

a) providing a dilatant material;
b) admixing a porous mineral having a pore size up to 100 Angstroms and a BET surface area in the range of 200 to 1000 $m^2/g$ to the dilatant material; and
c) filtering the dilatant/porous mineral admixture to remove liquid to form a filter cake.

A further aspect of this invention relates to the composition of the filter cake produced by the enhanced filtration method.

DETAILED DESCRIPTION OF PREFERRED EMBODIMENTS

Low Abrasion Calcined Clay

In accordance with one aspect of the present invention, the abrasion of calcined kaolin is reduced by the controlled leaching of silica from the kaolin by the use of a caustic aqueous leaching process. In general, the more silica leached out of the calcined kaolin, the greater the reduction in abrasion. The invention provides a method for reducing the abrasion of a calcined kaolin, as well as a calcined kaolin of reduced abrasion.

In conducting experiments on the effects of the leaching of silica from commercial fully calcined kaolin pigment to reduce abrasion, it was found that such leaching could result in an undesirable loss of pigment opacity. That is, the greater the degree of leaching, the greater the loss of opacity. While not wishing to be bound to any particular theory, it is believed that opacity loss of a caustic leached fully-calcined pigment may be attributable to the reduction of its "reflective index" which results from the loss of silica. When silica is removed, pores are generated. Reflex index of air is smaller than silica.

Another effect of caustic leaching is the reduction of particle size of the leached pigment. Particle size of the leached calcined pigment was generally smaller than that of the unleached pigment. The more leaching of the pigment, the greater reduction of its particle size.

In general, hydrous feed particles of a calcined kaolin pigment can be dispersed well in an aqueous slurry. However, any one particle of a fully calcined kaolin pigment (leached or unleached) is an aggregate of many individual particles which are the "calcined version" of the hydrous feed particles, and the aggregates of a calcined kaolin pigment are difficult to break. Thus, it is impossible to disperse a calcined kaolin into individual primary particles. When silica is leached out, some of the "glue" which holds the aggregates is lost, and the aggregates are broken to smaller pieces and correspondingly the particle size of leached fully calcined kaolin pigment becomes smaller. Thus, particle size reduction is not believed to be the direct cause of opacity loss.

In the process of the present invention, calcined kaolin is dispersed or slurried in an aqueous caustic solution, typically NaOH. Other bases such as potassium hydroxide can also be used. The silica (mainly amorphous) is leached from kaolin by being dissolved into the caustic solution, thus forming a sodium silicate mother liquor. The leaching conditions can be influenced by controlling leaching temperature, concentration of caustic and time duration of the leaching. The degree of leaching affects the abrasion, particle size, surface area and light scattering. For example, stronger leaching generally leads to lower abrasion, smaller particle size, larger surface area and a greater effect on light scattering. By controlling the degree of leaching, one can produce calcined pigments with a desired balance of properties, such as low abrasion and good light scattering.

It is important that leaching of the silica from the calcined clay be controlled and not proceed to an extend that is too severe. The term "severe" is intended to describe a point or condition of leaching wherein the optical properties (most notably the opacity) of the leached calcined clay is of little commercial value. Therefore, it is desirable that not more than 40, preferably not more than 25 and most preferably between 8 and 12 weight percent of silica be leached from the calcined clay.

The degree of leaching will depend on several factors such as:

leaching time;

porosity of the clay before leaching;

concentration of the leaching solution;

temperature of leaching; and percentage of solids of clay in the leaching slurry.

Thus, one skilled in the art will realize that any combination of the above parameters may be adjusted to achieve the desired amount of silica to be removed from the calcined clay.

In performing the controlled leaching of silica, however, it is desirable to use lower concentrations of caustic solution, for example, about 10 wt. % NaOH, preferably less than 10 wt. % NaOH, most preferably less than 5 wt. % NaOH. By using lower concentrations of the leaching solution, severe removal of silica can be avoided and the desired removal of silica is more readily controlled.

A preferred leaching technique in accordance with the present invention is as follows. An aqueous NaOH solution is prepared at a desired concentration. When the leaching is carried on at a temperature higher than ambient, the caustic solution may be heated before the kaolin is added, after the kaolin is added, or both before and after. The preferred kaolin is a hard kaolin, as described in the Fanselow patent, supra. However, suitable soft kaolins can also be used. The dispersion is then kept at the desired temperature for a desired length of time to carry on leaching. The particles are desirably kept uniformly suspended by the use of stirring means, such as a mixing blade. The mother liquor (sodium silicate solution) is then separated from the kaolin, as by decantation or filtration, followed by washing. When a dispersion form is the final desired product, the process is now complete. When a dry product is desired, the dispersion is filtered, and the solids are dried and then pulverized, by means well known in the art.

In accordance with a further aspect of the present invention, the optical properties of the leached calcined product are improved by optimizing the particle size distribution of the hydrous feed to the calciner, and by controlling the parameters of the leaching process. See the accompanying illustrative example.

The opacity of the leached calcined kaolin is improved by decreasing the average particle size of the hydrous kaolin feed material used to form the calcined product. This is a surprise, knowing that leaching causes reduction of particle size of the pigment. One would expect an increase the feed size would be required to compensate for the particle size reduction. However, we have discussed the cause of opacity loss and attributed it to the reduction of reflective index. The particle size reduction of the leached product is not related to the opacity loss.

Both opacity and brightness of a calcined kaolin pigment can be signficantly improved by reducing its hydrous kaolin feed size, particularly by eliminating the "coarse tail" of the feed. Hence, even with the opacity loss, a leached (improved) calcined pigment can show an opacity equal or better than a standard unleached calcined kaolin. By optimizing the hydrous feed size, we can first increase its opacity (and brightness) of a calcined kaolin whose increments compensate the loss of opacity caused by caustic leaching.

One method of making a hydrous feed with smaller particle size to the calcination process is to centrifuge the feed to remove the coarser particles from the finer particles, to obtain a feed with a higher weight percent of fine particles. For purposes of this study, product was analyzed for the weight percentage of particles of less than a 1 $\mu$m equivalent spherical diameter (ESD) particle size, expressed as wt %<1 $\mu$m. Samples were made with nominal feed sizes of 80 wt %<1 $\mu$m (coarsest), 85 wt %<1 $\mu$m, and 90 wt %<1 $\mu$m. Leached and unleached calcined products were tested in a paper filling study. A leached low abrasion sample was found to have reduced Needle abrasion by 30%, as compared to the uncentrifuged, unleached feed, while having a +0.7 point brightness improvement and a +0.9 opacity improvement.

Enhanced Filtration

Another aspect of the invention concerns an enhanced method of filtering the leached calcined clay of the present invention.

It has been observed that the leached calcined clay characteristic of this invention behaves as a dilatant material. The term dilatant refers to materials that exhibit a solid state appearance under shear conditions and a fluid appearance under low or non-shear conditions.

A problem with handling of dilatant materials is encountered when filtering with a rotary filter. In a rotary filtration process, a vaccum is applied to the inside of a perforated drum. The drum rotates in a tub of material to be filtered. The vacuum functions to draw the material to the drum and removes water and other supernatant materials. The filtered material (filter cake) is then removed from the drum by releasing the vacuum and subsequently picked up by a roll (cold roll). The filtered material on the cold roll is scrapped off by a blade and dropped into a trough where it is typically transferred for further processing by an auger.

However, when attempting to filter a dilatant material on a rotary filter, the material adhering to the drum rotates in a paste phase with little or no water or filtrate removed. When the vacuum is released, the dilatant material transforms into the liquid phase because of low or no shear. Thus, substantially no filtering occurs and the material runs off of the drum never get transferred to the cold roll for removal of solids.

We have found that by providing a porous mineral such as a zeolite, acceptable rates of filtration of the dilatant material are achieved.

The Porous Mineral

The porous minerals useful in this invention are characterized in having pore sizes up to 100 Angstroms, preferably less than 40 Angstroms, most preferably less than 10 Angstroms and a BET surface area in the range of 200 to 1000 m$^2$/g, preferably between 200 and 800 m$^2$/g, most preferably between 400 and 800 m$^2$/g. Desirably the porous minerals are uniformly porous.

Examples of such minerals, whether naturally occurring or synthetically manufactured, include zeolites, porous silica (including fumed, precipitated, aerogels, or hydrogels), alumina, calcium carbonate, montmorillonite (e.g., bentonite or hectorite), attapulgite, halloysite, vermiculite, diatomaceous earth, silicic anhydride, talc, aluminum silicate, calcium silicate magnesium silicate, barium sulfate, calcium sulfate, zinc oxide, and zirconia salt. Most preferred are zeolites.

Suitable natural zeolites include mordenite, clinoptilolite, ferrierite, dachiardite, chabazite, erionite, and faujasite.

Suitable synthetic zeolites include, but are not limited to, the synthetic faujasite crystal types, i.e. zeolites X and Y, as well as zeolites A, L, P, Beta, synthetic mordenite and ferrierite, ZSM-5, and MCM-22. Larger pore mesoporous silicates, such as MCM-41 and related phases, as well as other families of molecular sieves, such as aluminophosphates and titanosilicates, are also suitable phases. A particularly preferred zeolite is any member of the faujasite family. It is to be understood that these zeolites may include demetallated zeolites which are understood to include significant pore volume in the mesoporous range, i.e. 20 to 500 Angstroms.

Usually synthetic zeolites are prepared in the sodium form, that is, with a sodium cation in close proximity to each aluminum tetrahedron and balancing its charge. A number of principal types of zeolites have been reported. These zeolite types vary both in their crystallographic structure as well as composition. Depending on their crystal structures, zeolites have different pore sizes. These zeolitic pores, which are present uniformly throughout the structure, should be distinguished from other non-zeolitic macropores that may be present in certain particles. Examples of approximate pore diameters include chabazite (3.8 Å), zeolite A (4.1 Å), ZSM-5 (5.1–5.6 Å), and zeolite Y (7.4 Å).

The composition of the zeolites may vary depending on the number of tetrahedral sites that are occupied by aluminum versus silicon. This composition is usually expressed in terms of a $SiO_2/Al_2O_3$ ratio. For example, zeolites X and Y are both synthetic analogs of the mineral faujasite, but with different composition ranges as shown below:

| Zeolite X | $SiO_2/Al_2O_3$ = 2.0–3.0 |
| Zeolite Y | $SiO_2/Al_2O_3$ = 3.0–6.0. |

Other zeolites, such as ZSM-5, have much higher $SiO_2/Al_2O_3$ ratios.

A preferred zeolite is the synthetic Y type zeolite having a faujasite structure. Y type zeolite synthesized by any process can be used with no limitation. Typical properties of zeolite Y used in this invention are the following:

| $SiO_2/Al_2O_3$ | 4.5–5.5 |
| $Na_2O$ content | 12–14 % (volatile free basis) |
| BET Surface Area | 400–800 m$^2$/g |
| Particle size | 1–10 μm |
| XRD pattern | typical of faujasite type structures. |

The amount of porous material added is dependent on the nature of the dilatant material being filtered and nature of the porous material. Thus, one skilled in the art would be readily able to determine an effective amount of porous material to be added. For zeolite material having a particle size range of 1 to 5 micrometers, adding about from 1 to 40, preferably from 5 to 20 weight % zeolite to the dilatant material will have a measurable effect on filtration. In the instance of a caustic leached calcined clay having 20 weight percent of silica removed, the relative amount of 80 parts by weight leached calcined clay to 20 parts by weight of a sodium Y type zeolite, caused effective filtration as demonstrated in Example 2.

EXAMPLES

Example 1

This example demonstrates the improved optical properties obtained by controlling the particle size distribution of the hydrous kaolin fed to the process, and other parameters of leaching process. The process includes the following steps:

A. Preparation of fractionated feeds;

B. Pre-pulverizing the spray dried feed by an air impact pulverizer;

C. Calcination in a muffle furnace;

D. Leaching with NaOH solution at different concentrations for 2 hours at 180° F. (82° C.); and E. Washing, filtration, drying and post-pulverization with a MIKRO-PULVERIZER® mill with a 0.039 inch round hole screen.

For the preparation of fractionated feeds, a hydrous kaolin feed normally used to make ANSILEX 93® calcined kaolin pigment was used as the standard calcination feed. The standard feed, at 57.8% solids, was centrifuged for 10 minutes at 1000 rpm to obtain a feed cut having a particle size distribution with 92 wt %<1 μm (nominally referred to as the 90% feed). The same standard feed was centrifuged for 5 minutes at 1000 rpm to obtain a feed cut having a particle size distribution with 86 wt %<1 μm (nominally referred to as the 85% feed). Another sample of the same feed was centrifuged for 30 seconds at 1000 rpm to obtain a feed cut having a particle size distribution with 79 wt %<1 μm (nominally referred to as the 80% feed). A more complete summary of the particle size distribution of the standard feed, the 90% feed, 85% feed, and 80% feed are given below as measured by sedimentation using the SEDIGRAPH® particle size analyzer.

CUMULATIVE MASS %
FINER THAN NOTED PARTICLE SIZE

| Particle Size (Diameter) | Standard | 90% | 85% | 80% |
| --- | --- | --- | --- | --- |
| 1.0 | 71.9 | 92.0 | 85.8 | 79.2 |
| 0.5 | 60.5 | 79.9 | 72.1 | 67.2 |
| 0.4 | 53.9 | 72.7 | 64.5 | 59.8 |
| 0.3 | 43.7 | 61.1 | 52.9 | 48.8 |
| 0.25 | 37.6 | 53.3 | 45.6 | 42.1 |
| 0.20 | 30.2 | 43.7 | 36.8 | 34.2 |
| 0.18 | 26.4 | 39.0 | 32.7 | 30.6 |

All three cuts were then magnetically treated in a standard magnet unit at 25 tons per hour.

The samples were then spray dried, and pre-pulverized in a TROST TS Air Impact Pulverizer at 80 psi. The pulverized feed was then calcined in a muffle furnace for 40 minutes at 1096° C.

The leaching process was conducted at 180° F. (82° C.) for 2 hours in 2.7% NaOH solutions. Leaching at 2.7% NaOH made a 12.2 wt % silica loss for the 90% feed, 8.4% loss for the 85% feed, 8.2% loss for the 80% feed. Leached and unleached samples of the above three calcined products were investigated in a paper filling study, along with a sample of uncentrifuged, calcined standard feed. Tests were conducted on samples normalized to a 4% net mineral content, and the results are presented in Table 1. For each sample, "L" indicates leached, and "U" indicates unleached.

TABLE 1

| Sample | Brightness[1] | Opacity[2] | Abrasion[3] |
| --- | --- | --- | --- |
| Blank | 84.9 | 74.4 | 58 |
| Std.-U | 86.7 | 80.3 | 598 |
| 80%-U | 86.4 | 79.8 | 568 |
| 80%-L | 86.7 | 79.6 | 374 |
| 85%-U | 87.5 | 81.7 | 564 |
| 85%-L | 87.6 | 81.3 | 362 |
| 90%-U | 87.5 | 82.2 | 614 |
| 90%-L | 86.4 | 80.2 | 258 |

Notes:
[1] Brightness determined by TAPPI method T-452-OM-92 as measured with a Technidyne Model S-4 Brightness Tester.
[2] Opacity determined by TAPPI method T-45-OM-91 as measured with a Technidyne Model BNL-2 Opacity Tester.
[3] Abrasion determined by measuring the weight loss of a standard bronze needle as a result of making 10,000 penetrations of a 600 g/m$^2$ stack of the sample paper.

The results show marginally poorer opacity (0.2–0.4 point) for the leached pigments as compared to the unleached pigments at 80% and 85%. The 90% feed had poorer brightness and opacity as compared to the unleached control, possibly due to the greater silica loss (12% loss versus 8% for the 80% and 85% feeds). However, the unleached 85% and 90% feeds both had improved brightness and opacity when compared to the unleached standard. The leached 85% feed sample not only had reduced abrasion when compared to the unleached standard sample, but also had significantly improved brightness and opacity.

Example 2

This example demonstrates the extraordinary filtering benefit of the present invention.

A CONTROL sample was prepared from a 30% solids calcined clay slurry having been leached with a 15% NaOH solution for 1 hour at a temperature of 60° C. (resulting in a 20 wt. % loss of silica). To a portion of the CONTROL is added 20 parts by weight of a sodium, Y type zeolite (COMPARATIVE) in an amount to maintain a 30% solids slurry. Thus, both the CONTROL and COMPARATIVE were at 30% solids before filtering in a Buchner filter under 35 inches of mercury vacuum.

TABLE 2

| MATERIAL | TIME TO REACH 40% SOLIDS | % INCREASE IN FILTRATION |
| --- | --- | --- |
| CONTROL | 18 hours | — |
| COMPARATIVE | 3.5 hours | 514% |

As can be seen from Table 2, the addition of the zeolite had a tremendous effect on the filterability of the dilatant material.

The principles, preferred embodiments, and modes of operating of this invention have been described in the foregoing specification. However, the invention which is intended to be protected herein is not continued to be limited to the particular forms disclosed, since they are to be regarded as illustrative rather than restrictive. Variations and changes may be made by those skilled in the art without departing from the spirit of the invention.

What is claimed is:

1. A method for enhancing filtration of water from a dilatant material comprising the steps of:

(a) providing a dilatant material;

(b) admixing a porous mineral having a pore size of up to 100 Angstrom and a BET surface area in the range of 200 to 1000 m$^2$/g with the dilatant material; and (c) filtering the dilatant/porous mineral admixture to remove water and form a filter cake, and recovering said filter cake.

2. The method of claim 1, wherein the porous mineral is selected from the group consisting of zeolites, porous silica, alumina, calcium, carbonate, montmorillonite, attapulgite, halloysite, vermiculite, diatomaceous earth, silicic anhydride, talc, aluminum silicate, calcium silicate, magnesium silicate, barium sulfate, calcium sulfate, zinc oxide, and zirconia salt.

3. The method of claim 1, wherein the dilatant material is a leached calcined clay.

4. The method of claim wherein the dilatant material is a caustic leached calcined clay.

5. The method of claim 4, wherein the porous mineral is a Beta, X, Y, or L type zeolite.

6. The method of claim 5, wherein the zeolite is a Y-type zeolite.

7. The method of claim 6, wherein the zeolite is a sodium, Y type zeolite.

8. The method of claim 1, wherein filtration is by rotary vacuum drum.

9. The method of claim 1, wherein filtration is by vacuum belt.

10. The method of claim 1, wherein filtration is by screw press.

11. A filter cake produced by the method of any one of claims 1, 2, 3, 4, 5, 6 or 7.

* * * * *